United States Patent
Jacobson et al.

(10) Patent No.: US 11,599,365 B2
(45) Date of Patent: Mar. 7, 2023

(54) SHARING IMAGE INSTALLATION IMAGE STREAMS

(71) Applicant: HEWLETT PACKARD ENTERPRISE DEVELOPMENT LP, Houston, TX (US)

(72) Inventors: Erik Daniel Jacobson, Bloomington, MN (US); Derek Lee Fults, Orlando, FL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 197 days.

(21) Appl. No.: 17/078,267

(22) Filed: Oct. 23, 2020

(65) Prior Publication Data
US 2022/0129281 A1   Apr. 28, 2022

(51) Int. Cl.
    *G06F 9/00* (2006.01)
    *G06F 9/4401* (2018.01)
    *H04L 67/00* (2022.01)
    *H04L 9/40* (2022.01)
    *G06F 8/61* (2018.01)

(52) U.S. Cl.
CPC ............. *G06F 9/4416* (2013.01); *G06F 8/63* (2013.01); *H04L 63/0428* (2013.01); *H04L 67/34* (2013.01); *G06F 9/4401* (2013.01)

(58) Field of Classification Search
CPC ..... G06F 9/4416; G06F 8/63; H04L 63/0428; H04L 67/34
USPC .......................................................... 713/2
See application file for complete search history.

(56) References Cited

U.S. PATENT DOCUMENTS

| | | | | |
|---|---|---|---|---|
| 8,332,844 | B1 * | 12/2012 | Kulkarni | G06F 9/4416 717/176 |
| 8,595,331 | B2 * | 11/2013 | Henseler | G06F 8/61 717/172 |
| 9,577,951 | B2 | 2/2017 | Ayachitula et al. | |
| 2006/0136526 | A1 * | 6/2006 | Childress | G06F 11/1451 |
| 2015/0169875 | A1 * | 6/2015 | Ide | G06F 21/575 713/2 |
| 2015/0264119 | A1 * | 9/2015 | Shau | H04L 67/01 709/203 |
| 2015/0331707 | A1 * | 11/2015 | Hellkvist | G06F 8/63 718/1 |

(Continued)

OTHER PUBLICATIONS

Lifehacker; "A Beginner's Guide to BitTorrent"; https:/lifehacker.com/a-beginners-guide-to-bittorent-285489; downloaded Oct. 23, 2020; 15 pp.

(Continued)

*Primary Examiner* — Volvick Derose
(74) *Attorney, Agent, or Firm* — Trop, Pruner & Hu, P.C.

(57) ABSTRACT

A technique includes a first compute node of a cluster of nodes receiving a communication from a cluster maintenance node of the cluster instructing the first compute node to provide an installation image that is received by the first compute node to a second compute node of the cluster. The first node and the second node are peers. The technique includes sharing the first installation stream that communicates the image to the first compute node. Sharing the first installation stream includes, while the first compute node is receiving the first installation stream, the first compute node providing a second installation stream to communicate parts of the image received via the first installation stream to the second compute node.

20 Claims, 5 Drawing Sheets

(56) References Cited

U.S. PATENT DOCUMENTS

| | | | |
|---|---|---|---|
| 2016/0119249 A1* | 4/2016 | Ayachitula | H04L 67/34 |
| | | | 709/226 |
| 2017/0329645 A1* | 11/2017 | Chen | H04L 41/0806 |
| 2019/0097900 A1* | 3/2019 | Rodriguez | G06F 16/27 |
| 2019/0149414 A1* | 5/2019 | Varghese | H04L 41/0843 |
| | | | 709/220 |
| 2021/0271506 A1* | 9/2021 | Ganguly | H04L 67/34 |

OTHER PUBLICATIONS

Pair Networks Blog; "Rsync: What is it and How do I Use it?"; https://blog.pair.com/2018/03/13/rsync/; downloaded 0/23/2020; 8 pp.

Synchronizing NGINX Configuration in a Cluster, (Research Paper), NGINX Documentation. Downloaded Aug. 13, 2020; 9 Pgs.

Zhang, Z. et al., "VMThunder: Fast Provisioning of Large-Scale Virtual Machine Clusters", (Research Paper), IEEE Transactions on Parallel and Distributed Systems, Dec. 2014. vol. 25, No. 12, 11 pp., pp. 3328-3338.

\* cited by examiner

SHARING IMAGE INSTALLATION IMAGE STREAMS

BACKGROUND

A compute node may have a root file system. In general, the root file system includes the files and directories to boot up the compute node to a normal usable state. Other file systems can be mounted on top of the root file system. When stored in a persistent storage of the compute node, the root file system survives a power down or a reset of the compute node. Accordingly, the root file system persists each boot of the compute node. The compute node may store its root file system in a non-persistent storage (e.g., random access memory (RAM)), such as the case for a diskless compute node. The root file system of such a compute node does not survive a power down or a reset of the compute node, and consequently, each boot of the compute involves installing the root file system on the compute node. For this purpose, an installation image, which contains the root file system, is transferred to the compute node. In both cases (persistent storage and non-persistent storage), an installation image may be transferred to the compute node. However, in the case of the non-persistent storage, the root file system is provisioned on each boot.

DETAILED DESCRIPTION

A cluster may have a relatively large number (e.g., hundreds to thousands or even tens of thousands) of compute nodes (e.g., diskless compute nodes) that store their respective root file systems in non-persistent storage. When such a cluster reboots, it may be challenging to boot the compute nodes in a timely fashion due to the amount of network traffic involved in reinstalling root file systems on the compute nodes. More specifically, when a compute node (also called a "client compute node" herein) of the cluster boots, the client compute node submits a boot request, and a maintenance compute node of the cluster communicates a boot image to the client compute node in response thereto. The boot image establishes a node installation environment (e.g., a scaled down, miniature root file system) on the client compute node, and the node installation environment handles the installation of the root file system on the client compute node. As part of the installation of the root file system on the client compute node, the node installation environment of the client compute node requests and receives an installation image.

In this context, "an installation image" generally refers to a collection of data that represents a root file system. For example, the installation image may contain data that represents a directory structure that contains files, such as files that corresponding to an operating system kernel, executable files, configuration files, an operating system bootloader, and so forth.

The installation image may be relatively large (e.g., the installation image may have a size of one Gigabytes (GB) to forty GB, if not larger). For a cluster that has a relatively large number (e.g., thousands, if not tens of thousands) of client compute nodes, if appropriate measures are not undertaken, the corresponding relatively large number of installation image transfers upon boot of the cluster may saturate the cluster's network, prolong client compute node boot times and limit the overall compute node scalability of the cluster.

There are a number of potential ways that may be used to transfer installation images to client compute nodes of a cluster. For example, a file synchronization-based transfer (e.g., a file synchronization-based transfer using a Linux operating system-based utility tool called "rsync") is one potential way to transfer an installation image to a client compute node. With the file synchronization-based transfer, a full transfer of an installation image occurs between a server and a client compute node. A challenge with this type of transfer is that due to network saturation constraints, a given server may be limited to providing installation images to a relatively small number (e.g., ten to twenty) of client compute nodes.

Another potential way to transfer installation images to client compute nodes is through the use of a peer-to-peer file sharing protocol (e.g., a BitTorrent protocol). With the peer-to-peer file sharing protocol, the installation image is represented by a single archive file (e.g., a tape archive (TAR) file), and the single archive file is communicated in out of order chunks to the client compute nodes, with each client compute node communicating the chunks to other client compute nodes. Due to the storage of the installation image as a single archive file, any change in the installation image during the installation period may create a version disconnect, which means some client compute nodes may not be able to finish downloading the installation image. Moreover, because all of the client compute nodes help each other, network constraints, such as network switch-to-network switch links, may starve parts of the network; and it may be generally challenging to control network usage flow using the peer-to-peer file sharing protocol.

Another potential way to transfer installation images to client compute nodes is through the use of a multicast network transport mechanism. However, challenges may arise in configuring and maintaining proper operations of network switches for the multicast transfers. Not all of the network switches may properly pass the network traffic, and having the client compute nodes separated into various virtual networks may impose a high management overhead in maintaining and updating network switches that correspond to different vendors and have different environments.

In accordance with example implementations that are described herein, a cluster uses installation stream sharing to communicate installation streams from installation servers to client compute nodes. In this context, an "installation stream" is communicated between a provider node and a client compute node and refers to a time sequence of data that communicates an installation image in its entirety. The "provider node" may be an installation server or another client compute node (called a "helper compute node" herein). The "installation stream sharing" refers to the actions taken by the helper compute nodes to replicate the installation streams received by the helper compute nodes and provide the replicated installation streams to other peer, client compute nodes. In this manner, in accordance with example implementations, a given helper compute node is a client compute node, which provides an installation stream to at least one other client compute node of the cluster while the given helper compute node is receiving an installation stream from an installation server. As described herein, in accordance with example implementations, the helper compute nodes, as well as the other client compute nodes that receive installation streams from the helper compute nodes, are selected in a way that minimizes network congestion.

Using the installation stream sharing that is described herein, the compute nodes of a cluster may be booted in a relatively short time, even for a cluster that contains a large number of compute nodes (e.g., thousands or tens of thousands of compute nodes) and even for a relatively large (e.g., one GB to forty GB, if not larger) installation image. The installation stream sharing is robust and tolerates network switches heterogeneity. The installation stream sharing may avoid elaborate network link layer protocols, such as multicast protocols; the installation stream sharing may avoid the complexities of file block list sharing (e.g. seeders, trackers, and an associated infrastructure). Moreover, with the installation stream sharing, the number of client compute nodes for a cluster may be upscaled without saturating the cluster's network and without significantly impacting client compute node boot times.

Figure 1:
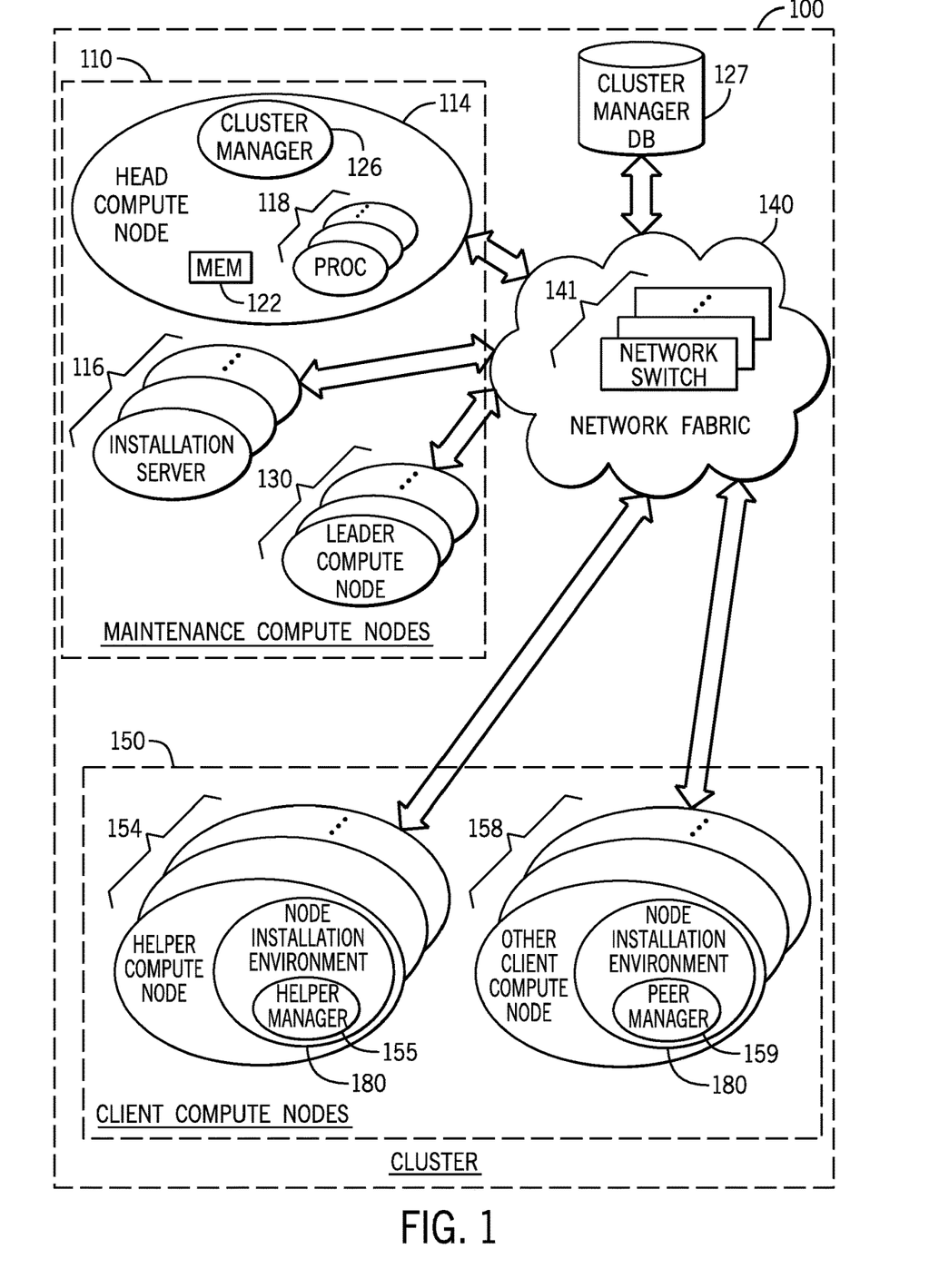
FIG. 1 is a schematic diagram of a cluster of compute nodes according to an example implementation.

Referring to FIG. 1, as a more specific example, in accordance with some implementations, a cluster 100 includes client compute nodes 150 that store their root file systems in volatile memories. For example, in accordance with some implementations, each client compute node 150 may have a root file system (e.g., a temporary file system (TMPFS) file system) that is stored in a volatile memory (e.g., RAM) of the client compute node 150. Due to the storage of its root file system in volatile memory, a reinstallation of the root file system occurs on each boot of the client compute node 150. In this context, a "boot" or "reboot" of a client compute node 150 generally refers to a startup sequence of the client compute node 150, which occurs in response to a power up or a reset of the client compute node 150.

In accordance with further example implementations, one or multiple client compute nodes 150 may have persistent storage and may store their respective root file systems in persistent storage. Although such client compute nodes 150 may not reinstall their root file systems on every boot, the installation stream sharing that is described herein may be used to transfer installation images to these client compute nodes 150 when the client compute nodes 150 install their root file systems.

In addition to the client compute nodes 150, in accordance with example implementations, the cluster 100 includes maintenance compute nodes 110, such as a head compute node 114 and leader compute nodes 130. The maintenance compute nodes 110, in general, manage the client compute nodes 150, including provisioning the client compute nodes 150 with the installation images. In accordance with example implementations, this provisioning includes instructing certain client compute nodes 150 (called "helper compute nodes 154 herein") to share their received installation streams with other client compute nodes 150; and the provisioning includes instructing some client compute nodes 150 to receive their installation streams from helper compute nodes 154 instead of from installation servers.

The head compute node 114, in accordance with example implementations, is the main, or principle, maintenance compute node for the cluster 100. In general, the leader compute nodes 130 are additional maintenance compute nodes 110 for the cluster network 100, which are delegated administrative duties to prevent overloading of the head compute node 114.

In accordance with example implementations, the head compute node 114 may be formed from an actual physical machine that is made from actual software and actual hardware. For example, the head compute node 114 may include one or multiple processors 118 (e.g., central processing units (CPUs), CPU processing cores, and so forth) and a memory 122. As an example, the memory 122 may store machine executable instructions that, when executed by the processor(s) 118, form a cluster manager 126. The memory 122, in general, is a non-transitory storage medium that may be formed from semiconductor storage devices, memristor-based storage devices, magnetic storage devices, phase change memory devices, a combination of one or more of these storage technologies, and so forth. Moreover, the memory 122 may represent a combination of different storage types, such as a volatile memory and/or a non-volatile memory. The physical machine may take on one of many different forms, such as one or multiple rack-mounted modules, a desktop computer, a laptop computer, a tablet computer, a smartphone, a wearable computer, and so forth. Depending on the particular implementation, the head compute node 114 may be formed from an entire actual physical machine or a portion thereof. Moreover, in accordance with some implementations, the head compute node 114 may include and/or correspond to one or multiple virtual components of an actual physical machine, such as one or multiple virtual machines, one or multiple containers, and so forth.

In a similar manner, in accordance with example implementations, the other compute nodes of the cluster 100, such as the leader compute nodes 130 and the client compute nodes 150, may also be formed from corresponding actual physical machines; may or may not correspond to the entirety of their corresponding physical machines; and may include and/or correspond to one or multiple virtual components of their corresponding physical machines. Although the maintenance compute nodes 110 store their respective root file systems in persistent storage, as noted above, in accordance with example implementations, the client compute nodes 150 do not store their respective root file systems in persistent storage.

In accordance with example implementations, one or multiple installation servers 116 of the cluster, upon boot of the cluster 100, provision the cluster 100 for the installation stream sharing, including designating certain compute nodes 150 for certain roles in the installation stream sharing and serving the installation images. A given installation server 116, in accordance with example implementations, may be formed from all or part of an actual physical machine that includes actual software and actual hardware. For example, in accordance with some implementations, an installation server 116 may correspond to a particular maintenance compute node 110 (i.e., the head compute node 114 or a leader compute node 130) and may serve one or multiple installation streams. In accordance further implementations, an installation server 116 may be a dedicated physical machine. In accordance with some implementations, an installation server 116 may be a virtual server (e.g., a container, a virtual machine, and so forth) that is hosted on a physical machine. In accordance with example implementations, the installation servers 116 may be on the head compute nodes 114 and/or leader compute nodes 130, i.e., the head compute node and/or leader compute nodes 130 may act as installation servers 116.

More specifically, in accordance with example implementations, as part of the installation stream sharing provisioning, the installation servers 116 may designate certain client compute nodes 150 to be "helper compute nodes 154." In accordance with example implementations, each of the other remaining client compute nodes 150, called the "client compute nodes 158" herein, is configured to receive its installation stream from either an installation server 116 or a helper compute node 154. As described further herein, one or multiple installation servers 116 provide installation streams to the helper compute nodes 154, with each installation stream communicating an installation image. Each helper compute node 154, in turn, provides its received installation stream with one or multiple of the client compute nodes 158. In general, in accordance with example implementations, the helper compute node 154 is a client compute node 150 that receives an installation stream and has been directed by an installation server 116 to share the received installation stream with one or multiple other client compute nodes 158. Moreover, one or more installation servers 116 may provide one or multiple installation streams directly to one or multiple of the client compute nodes 158, and for these cases, installation stream sharing is not used.

As depicted in FIG. 1, in accordance with example implementations, the head compute node 114, leader compute nodes 130, installation servers 116, helper compute nodes 154 and peer compute nodes 158 communicate with each other via network fabric 140. In general, the network fabric 140 may include components and use protocols that are associated with one or multiple types of communication networks, such as (as examples) Fibre Channel networks, iSCSI networks, ATA over Ethernet (AoE) networks, Hyper-SCSI networks, Gen-Z fabrics, dedicated management networks, local area networks (LANs), wide area networks (WANs), global networks (e.g., the Internet), wireless networks, or any combination thereof. Moreover, the network fabric 140, in accordance with example implementations, includes network switches 141, and least some of the network switches 141 may be connected to each via network cabling (e.g., Ethernet cables). As further described herein, potential network saturation bottlenecks due to the network switch-to-network switch cabling are taken into account and avoided for purposes of provisioning the installation stream sharing.

In accordance with some implementations, the cluster network 100 may include a cluster manager database 127. Although depicted in FIG. 1 as being accessible via the network fabric 140, in accordance with further implementations, the cluster manager database 127 may be stored locally in storage on one of the maintenance compute nodes 110, such as the head compute node 110. Moreover, in accordance with further example implementations, the cluster manager database 127 may be distributed over several locations of the cluster 100.

In accordance with some implementations, the cluster manager database 127 stores data that defines the management roles of the maintenance compute nodes 110 and the installation stream sharing roles of the client compute nodes 150. Moreover, in accordance with example implementations, the cluster manager database 127 may store data representing network configuration details, which may be used for purposes of assigning the installation stream sharing roles.

The cluster manager database 127, in accordance with some implementations, may have entries that correspond to respective client compute nodes 150 and contain data that represents network related details of the client compute nodes 150. For example, an entry in the cluster manager database 127 for a given client compute node 150 may have information that identifies a particular network switch 141 and a port to which the client compute node 150 is connected. From the information that is contained in the cluster manager database 127, the cluster manager 126 or a human cluster administrator may identify roles for the client compute nodes 150 for the installation stream sharing in a manner that avoids saturating the network infrastructure, as further described herein. The cluster manager database 127 may, in accordance with example implementations, store data entries representing other information, such as role assignments for compute nodes of the cluster 100 (e.g., information designating the roles of maintenance compute nodes 110, information designating the helper compute nodes 154, information designating roles for the installation servers 116, and so forth) and lists of compute nodes 158 that are served by each helper compute node 154.

In accordance with example implementations, the installation streams may be transferred over a secure shell (SSH) pipe between two SSH connection endpoints. As an example, a given helper compute node 154 and an installation server 116 may negotiate SSH parameters to set up two corresponding SSH endpoints. In an SSH session over these SSH connections, the installation server 116 may transfer, or pipe, a tape archive (TAR) file (i.e., the "installation image" for this example), as a "TAR stream" to the helper compute node 154." Here, the "TAR stream" refers to the content of a TAR file being communicated, or piped, between SSH connections in a flow, rather than the TAR file being sent as a single file. That is, in accordance with example implementations, TAR stream is being generated at the sender (e.g., the installation server or helper compute node 154) at the same time the TAR stream is being sent until there are no more files and/or directories to send and at which time the sending of the data representing the file and/or directories is complete. In accordance with example implementations, no intermediate file is created in the transmission of the TAR stream.

As a more specific example, in accordance with some implementations, "/images/rhel8-compute" may be a directory under which a root file system tree resides representing a compute node's root file system. In accordance with example implementations, the sender (e.g., an installation server 116 or helper compute node 154) of the installation stream does not make a TAR archive file out of "/images/rhel8-compute", but rather, the sender starts a TAR stream so that the sender pipes all of the data corresponding to "/images/rhel8-compute" through commands as the data leaves the sender. In other words, in accordance with example implementations, an actual archive file is not created at the sender, as the streaming involves sending the data representing the root file system directly until all the data has been sent. In accordance with further implementations, other data packages and/or data transfer techniques may be used to transfer the installation streams. For example, in accordance with further implementations, rsync-based file transfers may be used over SSH pipes.

As an overview, the cluster 100 may boot as follows. Each client compute node 150, upon the initial phase of its boot, communicates a boot request over the cluster network, and the cluster manager 126 responds by causing a maintenance compute node 110 (i.e., the head compute node 114 or a leader compute node 130) to provide a boot image to the compute node 150. The boot image configures the client compute node 150 to boot into a node installation environment 180 that contains a tool chain for the cluster manager 126. As described herein, in accordance with example implementations, the node installation environment 180 includes a utility or tool called a "helper manager 155," which manages and helps set up installation stream sharing for client compute nodes 150 that have been designated as helper compute nodes 154, and the node installation environment 180 includes a utility or tool called a "peer manager 159," which manages and helps set up the receipt of an installation stream for non-helper client compute nodes 158.

For example implementations in which the client compute node 150 stores its root file system in a volatile in-memory file system (e.g., implementations in which the client compute node 150 uses a TMPFS in-memory file system) that does not survive a power down or a reset of the client compute node 150, the node installation environment 180 first allocates the system memory of the client compute node 150 by mounting the in-memory file system. For example implementations in which the client compute node 150 stores its root file system in a persistent file storage (e.g., a client compute node 150 that uses a network file system (NFS)), the node installation environment 180 first creates partitions on the disk drives of the client compute node 150 and then creates the initial file system to be used with the root file system.

After the partitions (if any) and file systems are created, the node installation environment 180 of the client compute node 150 issues, or provides, an installation request. The installation request represents a request for an installation image to be transferred onto the initial file system or the TMPFS mount point of the client compute node 150, depending on the particular implementation. In accordance with example implementations, an installation server 116 responds to the installation request according to one of three cases, which depends on the role the requesting client compute node 150 has in the transfer of installation images.

For the first case, the client compute node 150 has not been designated to participate in installation stream sharing (i.e., a helper compute node 154 is not involved), and the installation server 116 sets up the client compute node 150 to receive an installation stream directly from the installation server 116. For example, in accordance with example implementations, an installation server 116 and the client compute node corresponds to endpoints of an SSH connection, and the installation server 116 communicates a TAR stream containing the installation image to the client compute node 150 via the SSH connection.

Figure 2:
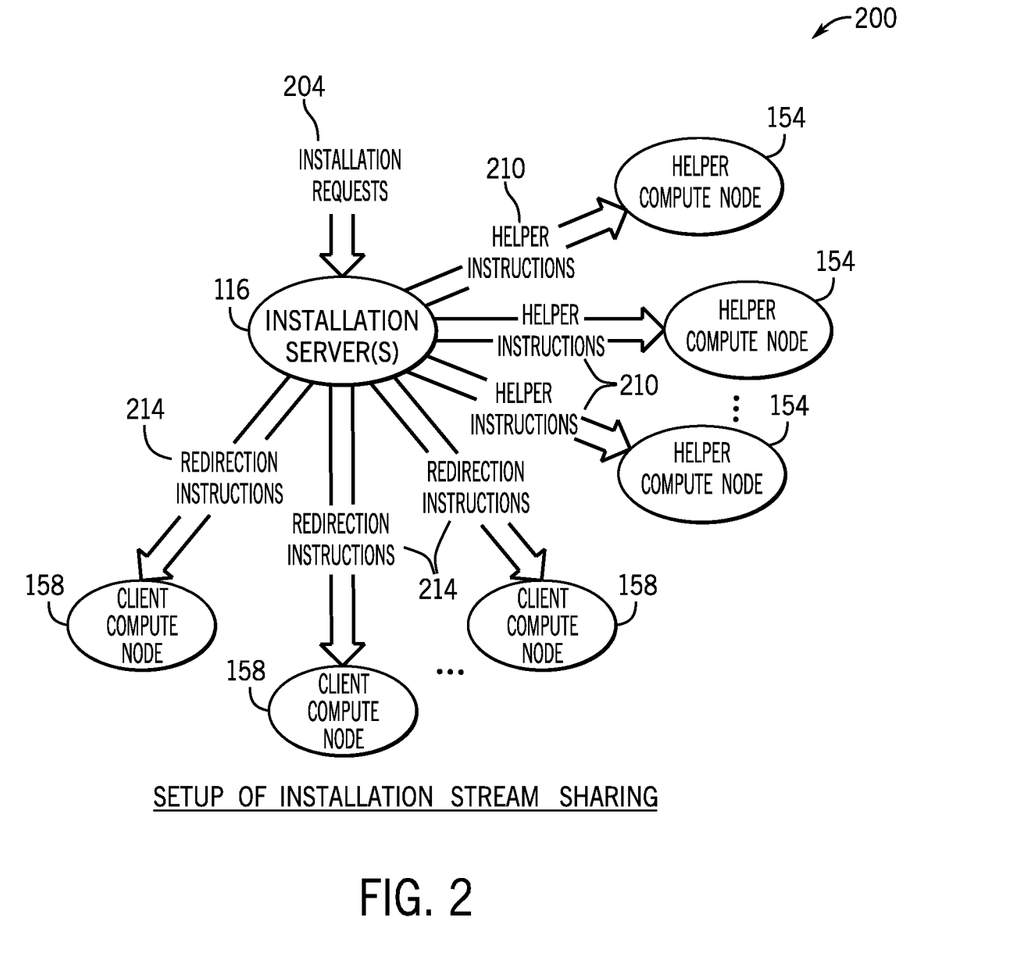
FIG. 2 is an illustration of a setup of installation stream sharing for the cluster according to an example implementation.

Referring to FIG. 2 (depicting an illustration 200 of a setup of the installation stream sharing) in conjunction with FIG. 1, for the second case, the client compute node 150 has been designated as being a helper compute node 154, and through the use of the helper manager 155, the installation server 116 sends helper instructions 210 to instruct the node installation environment 180 that the compute node is a helper compute node 154 and is to share the installation image that the compute node receives with one or multiple other peer client compute nodes 158 in parallel.

In accordance with example implementations, the helper instructions 210 include a list of peer client compute nodes 158 with which the helper compute node 154 will share its installation stream. In accordance with example implementations, after the installation stream to the helper compute node 154 begins, the installation stream sharing begins in that the helper manager 155 starts the additional installation stream(s) to the peer compute node(s) 158 on the list. In accordance with example implementations, as bytes of data in the incoming installation stream are received by the helper compute node 154, the helper compute node 154 sends the bytes of data in parallel to the peer client compute node(s) 158 on the list while the helper compute node 154 also writes the bytes of data to its own disk drive(s) or TMPFS (depending on the particular implementation).

For the third case, the client compute node 150 has been designated as being a client compute node 158 that is the recipient of an installation stream that is provided by a helper compute node 154. Through the use of the peer manager 159 of the client compute node 158, the installation server 116 sends redirection instructions 214. Although for this case, the client compute node 158 is not used to share its received installation stream with other compute nodes, the instructions 214 inform the client compute node 158 that the installation server 116 does not need the help of the compute node 158, and the instructions 214 further inform the client compute node 158 that the installation stream will be served or provided by a particular helper compute node 154, instead of being directly provided by an installation server 116.

In accordance with example implementations, if a given client compute node 158 is instructed by the installation server 116 that the installation image is being provided by a particular helper compute node 154, then the client compute node 158 waits for the installation session to begin from this particular helper compute node 154. In accordance with example implementations, for purposes of security, the peer manager 159 of the client compute node 158 may set up firewalls or other mechanisms (e.g., an SSH configuration) to block all but the expected helper compute node 154 that is to provide the installation image. In this way, the client compute node 158 may restrict sessions and security exposures, which may otherwise be exploited by attackers. Moreover, such information allows the client compute node 158 to avoid undesired installation attempts.

As mentioned above, the installation stream between two compute nodes may be transferred by any of a number of different delivery mechanisms, such as a TAR stream piped over SSH, rsync over SSH, and so forth. Regardless of the delivery mechanism that is used, the installation stream is between two compute nodes, a provider compute node and a recipient compute node; and the installation stream involves the full transfer of an installation image from the provider compute node to the recipient compute node. After the recipient client compute node 150 receives the installation image and installs its root file system, the client compute node 150 may then begin a startup of its operating system, which may include, for example, the execution of an operating system loader to load an operating system and the transfer of the control of the recipient compute node 150 to the loaded operating system.

Figure 3:
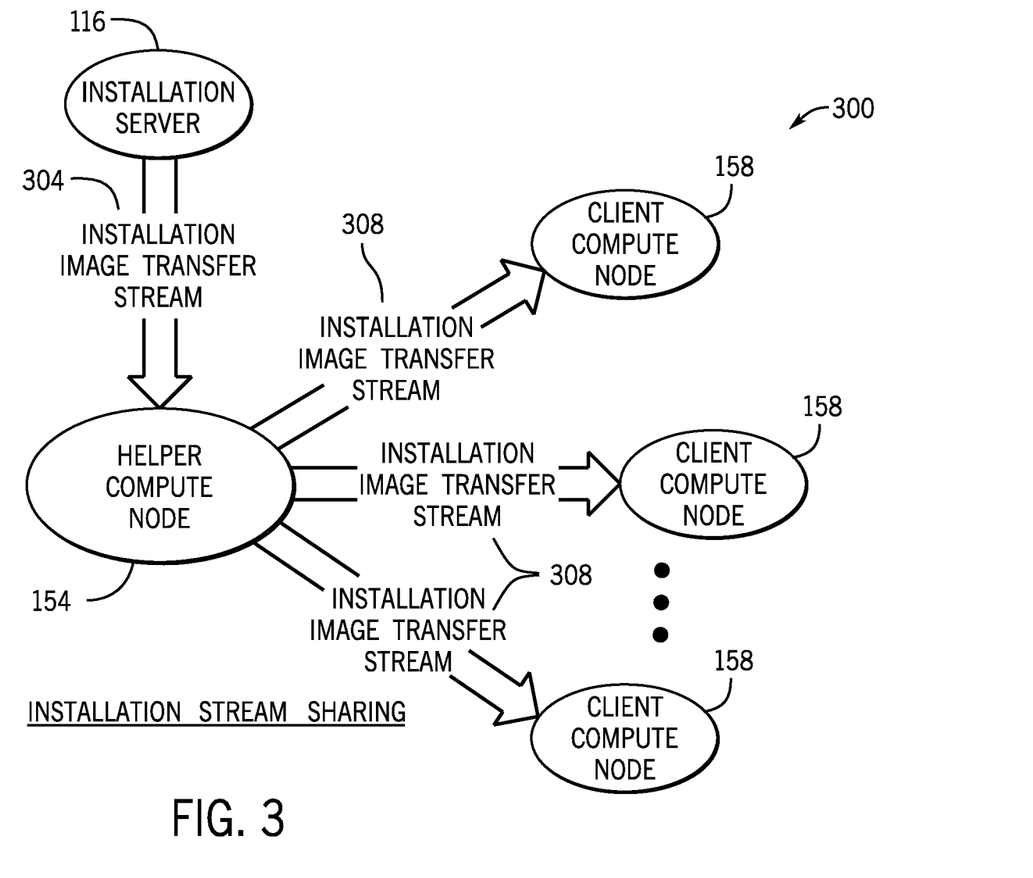
FIG. 3 is an illustration of installation stream sharing according to an example implementation.

FIG. 3 is an illustration 300 depicting installation stream sharing according to an example implementation. Referring to FIG. 3 in conjunction with FIG. 1, as part of the installation stream sharing, a given helper compute node 154 receives an image installation stream 304 from an installation server 116. The helper compute node 154 simultaneously shares, in parallel, the image installation stream 304 with a designated set of peer client compute nodes 158 by providing corresponding installation streams 308 to each of these peer compute nodes 158.

Referring back to FIG. 1, the network fabric 140 may have multiple layers of network switches 141. When two network switches 141 are connected to extend the network fabric 140, the link between those two network switches 141 may potentially introduce a performance bottleneck for installation image transfers. More specifically, network switch-to-network switch communications may involve network cabling (e.g., Ethernet network cabling extending between network switches), and unlike the backplane communications inside a network switch, a network cabling connection may be a relatively low bandwidth connection that may become a point of network saturation. In accordance with example implementations, the roles of the client compute nodes 150 in the installation stream sharing may be selected to minimize network switch-to-switch communications.

As a more specific example, if client compute nodes n1 to n24 are, for example, connected by backplane connections to network switch number one, and client compute nodes n25 to n48 are connected by backplane connections to network switch number two, then there may be a preference to designate some of the client compute nodes n1 to n24 as helper compute nodes 154, which share their installation streams with other of the nodes n1 to n24. For example, an installation server 116, when setting up the installation stream sharing, may instruct the compute node n1 to help the compute nodes n2 to n13 in the installation. Continuing the example, there may be a preference against having the client compute nodes n1 to n24 helping the installation of client nodes n25 to n48. For example, an installation server 116, when setting up the installation stream sharing, may not have the client compute node n1 help the client compute node n26 installation to avoid saturating the link between network switch number one and network switch number two.

In accordance with example implementations, selection of the installation stream sharing roles may be determined based on the network hierarchy of the system. For example, if the client compute nodes 150 are named by racks and chassis numbers, and this naming follows the network topology, then, for example, a determination may be made that the compute nodes in racks one and two are served by the same network switch. In accordance with some implementations, the installation server 116 may dynamically decide the installation stream sharing roles for a group of client compute nodes 150 assigned to the installation server 116 dynamically. For example, in accordance with some implementations, the cluster manager 126 may wait for a predetermined number of installation requests and assign installation servers 116 to these requests; and the installation servers 116 may assign the roles to the corresponding assigned client compute nodes 150. In accordance with further example implementations, the cluster manager 126 may determine the installation sharing roles and communicate these roles to the installation servers 116. In accordance with further example implementations, the roles may be predesignated (e.g., determined by a human administrator) and stored in the cluster manager database 127.

In accordance with example implementations, the installation servers 116 wait for installation requests, i.e., the requests submitted by the node installation environments of the client compute nodes 150 for the installation images. In accordance with example implementations, the installation servers 116 have knowledge of the topology of the clusters' network and are ready to instruct certain client compute nodes 150 to replicate, or share, their installation streams with other peer client compute nodes 150 of the cluster 100.

As the installation requests are received, in accordance with example implementations, the installation servers 116 send out the helper instructions 210 (FIG. 2) and redirection instructions 214 (FIG. 2). For example, if 288 client compute nodes 150 are requesting installation images, then the installation servers 116 may designate twelve of the client compute nodes 150 to be helper compute nodes 154 and instruct the remaining client compute nodes 150 to receive their installation images from either these helper compute nodes 154 or from installation servers 116 directly. This avoids network saturation because the number of streams from the installation servers 116 is kept at a relatively low number.

In accordance with example implementations, the installation servers 116 determine how many client compute nodes 150 are requesting an installation image and the locations of the client compute nodes 150 in the network infrastructure. It is noted that, depending on the particular implementation, all client compute nodes 150 may be rebooted at once, or, in accordance with example implementations, the client compute nodes 150 may be booted at different times, in respective batches.

In accordance with example implementations, the actual signaling for the installation requests may come from the client compute nodes 150, as each client compute node 150 starts its node installation environment 180. This may, however, represent a challenge to the installation servers 116, as the installation servers 116 should be able to scale the installations. One way for the client compute nodes 150 to aid in the scaling of the installation is for the client compute nodes 150 to contact the installation servers 116 as the client compute nodes 158 perform their network booting. However, the installation servers 116 may not be aware of how many client compute nodes 150 will be requesting installation at any one time.

In accordance with example implementations, the installation servers 116 may wait for a predetermined period of time for a set of client compute nodes 150 to boot up. For example, in accordance with some implementations, the installation servers 116 may wait for a predetermined time period, such as twenty seconds (as an example), after its first installation request before initiating any installations in a corresponding installation session. In these twenty seconds, it is likely that most of the client compute nodes 150 that were rebooted have contacted the installation servers 116 with installation requests. After the twenty seconds expires, each installation server 116, for its set of client compute nodes 150 that have contacted the installation server 116, may then compute how many of the client compute nodes 150 are behind each network switch; and the installation server 116 may then construct a list specifying the helper compute nodes 154, the client compute nodes 150 for which each helper compute node 154 is to share its installation stream, and the client compute nodes 150 that are to receive their installation streams directly from the installation server 116. In accordance with example implementations, after the installation server 116 begins the installation streams, the installation server 116 may queue up installation requests from additional client compute nodes 150 for the next installation session.

In accordance with further example implementations, an installation server push technique may be used. For these implementations, a system administrator may instruct an installation server 116 which client compute nodes 150 to install. The installation server 116 may create a list of the installation stream sharing roles in advance because the installation server 116 already knows every compute node 150 for which the installation server 116 will be doing an installation at the same time. The installation servers 116 wait for all of the expected client compute nodes 150 to boot their node installation environments 180 and check in with the installation servers 116. After the expected client compute nodes 150 have registered, the installation servers 116 may then initiate the providing of the installation streams. Because the installation servers 116 know all of the client compute nodes 150 that will boot at the same time, the installation servers 116 may construct all of the information to scale the installation in advance rather than dynamically.

In accordance with example implementations, the installation servers 116 may work in concert as follows. The leader compute nodes 130 and the head compute node 114 participate in network shared storage. Therefore, when an installation image is made ready, this image is pushed into a shared storage area, and the exact same content is available to the head compute node 114 and the leader compute nodes 130. This ensures that there is an agreement between the head compute node 114 and the leader compute nodes 130 on the content of the installation image. This may also be directly used as part of container services for implementations in which the installation servers 116 are formed from containers.

In accordance with example implementations, each client compute node 150 is pointed to a specific installation server 116 for installation. In this way, in accordance with example implementations, each installation server 116 handles a subset of the cluster 100, which may significantly minimize network congestion. If all client compute nodes 150 in rack one are connected, for example, to a pair of stacked network switches, then the installation server 116 that serves the rack one may create the list of client compute nodes 150 for installation, and the majority of the network traffic related to the installation image transfers stays in those stacked switches and do not saturate the network switch-to-switch links. If the second leader compute node 130 serves, for example, rack two, the installation server 116 for the client compute nodes 150 on rack two may manage the content for rack two and therefore, would have minimal contact with the client compute nodes 150 of rack one.

As a more specific example of the installation stream sharing for the helper compute node 154, in accordance with some implementations, the helper compute node 154 may initially execute a scaled down Linux operating system, as part of a "miniroot," or miniature root file system, which corresponds to the node installation environment 180 of the helper compute node 154. As part of the node installation environment 180, the helper compute node 154 may use Linux process substitution. For example, the helper compute node 154 may pipe an input TAR stream (provided by an installation server 116, for example) through the Linux "socat" command and the Linux "tee" command in a way that multiple commands may be started to pass the input to multiple output programs at once. Therefore, a single installation stream that is received by the helper compute node 154 may be replicated to multiple output installation streams that are provided by the helper compute node 154 to client compute nodes 158.

For example, in accordance with example implementations, an installation server 116 may execute, or run, administrative node test script to clear test directories, connect to the helper compute node 154 and execute, or run, compute node helper script, which instructs the helper compute node 154 to install itself as well as send the installation stream to other client compute nodes 158.

As an example, the administrative node test script may be as follows:
!/bin/bash
echo "purging old/tmp/testdir and creating an empty directory"
pdsh -g su-leader rm -rf/tmp/testdir
pdsh -g su-leader mkdir -p/tmp/testdir
echo "starting the TAR session, piped through ssh, to the cnode helper"
echo "leader1 is the helper, the other leaders are redirected install nodes."
time TAR -B -S --numeric-owner --one-file-system -C/opt/clmgr/image/images/foo -cf -.|ssh leader1/root/cnode-helper.sh
echo "Size of /tmp/testdir on the nodes . . . "
pdsh -g su-leader du -sh/tmp/testdir
In the script above, "pdsh" is a command that allows commands to be run on many compute nodes in parallel, and that "su-leader" is the name of the group that contains the list of compute nodes.

In accordance with example implementations, the helper compute node 154 executes a script to receive the installation stream from the installation server 116, duplicate the received installation stream into eight output installation streams and send the eight output installation streams to eight corresponding peer client compute nodes 158.

An example script that may be executed by the helper compute node 154 appears below:
! /bin/bash
Take stdin TAR stream from the admin node
extract the image locally and forward to other nodes
cat|\
tee >(socat-EXEC:'ssh leader2.head TAR -B -S --numeric-owner --one-file-system --acls --xattrs -C /tmp/testdir -xpf-')\
>(socat-EXEC:'ssh leader3.head TAR -B -S --numeric-owner --one-file-system --acls --xattrs -C /tmp/testdir -xpf-')\
>(socat-EXEC:'ssh leader4.head TAR -B -S --numeric-owner --one-file-system --acls --xattrs -C /tmp/testdir -xpf-')\
>(socat-EXEC:'ssh leader5.head TAR -B -S --numeric-owner --one-file-system --acls --xattrs -C /tmp/testdir -xpf-')\
>(socat-EXEC:'ssh leader6.head TAR -B -S --numeric-owner --one-file-system --acls --xattrs -C /tmp/testdir -xpf-')\
>(socat-EXEC:'ssh leader7.head "TAR -B -S --numeric-owner --one-file-system --acls --xattrs -C /tmp/testdir -xpf-')\
>(socat-EXEC:'ssh leader8.head TAR -B -S --numeric-owner --one-file-system --acls --xattrs -C /tmp/testdir -xpf-')\
>(socat-EXEC:'ssh leader9.head TAR -B -S --numeric-owner --one-file-system --acls --xattrs -C /tmp/testdir -xpf-')\
|TAR -B -S --numeric-owner --one-file-system --acls --xattrs -C /tmp/testdir -xpf -

In accordance with further example implementations, the commands for the helper compute node 154 may be run by the installation server 116. That is, the exact commands for the helper compute node 154 may, in accordance with example implementations, be entirely specified by incoming remote SSH commands.

Other implementations are contemplated, which are within the scope of the appended claims. For example, as described herein, the installation stream sharing includes one level of sharing, i.e., the helper compute nodes 154 share their installation streams with other compute nodes 158. However, in accordance with further implementations, there may be multiple levels of installation stream sharing. For example, in accordance with some implementations, a first client compute node 150 may share its installation stream with a second client compute node 150, and the second client compute node 150 may share its installation stream with a third client compute node 150.

Figure 4:
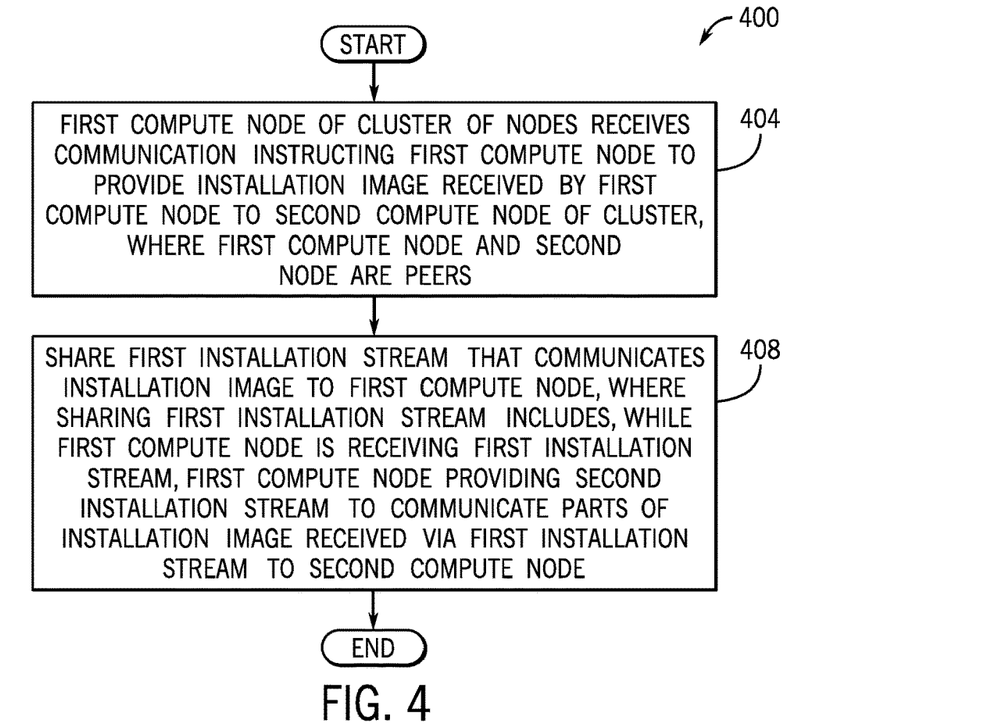
FIG. 4 is a flow diagram depicting a process to share an installation stream that communicates an installation image according to an example implementation.

Referring to FIG. 4, in accordance with example implementations, a technique 400 includes, pursuant to block 404, a first compute node of a cluster of nodes receiving a communication from a cluster maintenance node of the cluster. The communication instructions the first compute node to provide an installation image that is received by the first compute node to a second compute node of the cluster. The first node and the second node are peers. The technique 400 includes sharing (block 408) the first installation stream that communicates the image to the first compute node. Sharing the first installation stream includes, while the first compute node is receiving the first installation stream, the first compute node providing a second installation stream to communicate parts of the image received via the first installation stream to the second compute node.

Figure 5:
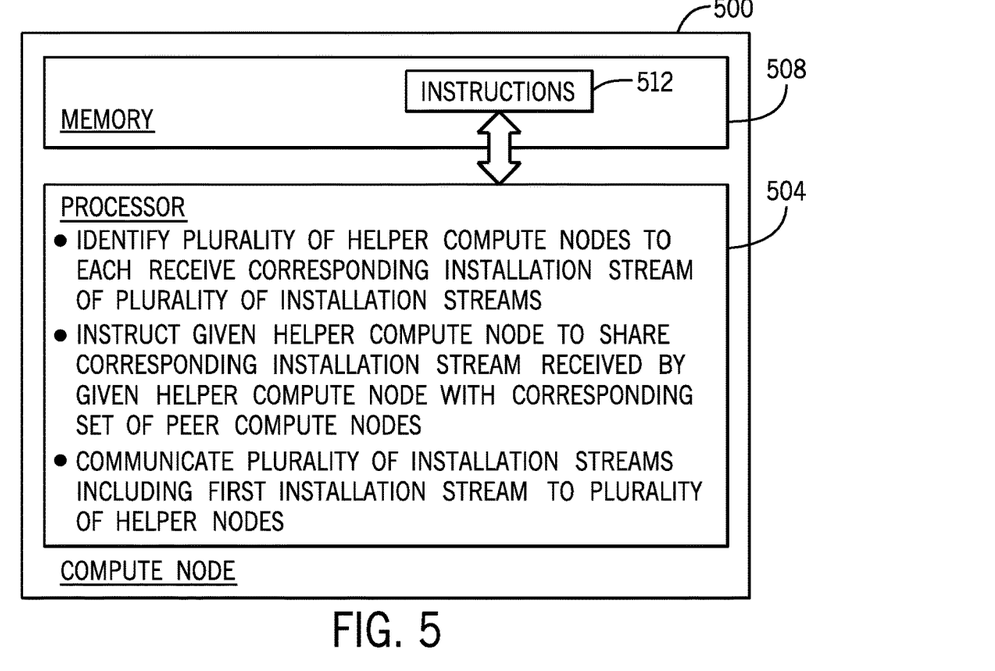
FIG. 5 is a schematic diagram of a compute node that instructs helper compute nodes to share an installation image according to an example implementation.

Referring to FIG. 5, in accordance with example implementations, a compute node 500 includes a processor 504 and a memory 508. The memory 508 stores instructions 512 that, when executed by the processor 504, cause the processor 504 to identify a plurality of helper compute nodes that each receive a corresponding installation stream; instruct each helper compute node to share an installation stream that is communicated by the first compute node to a corresponding set of peer compute nodes; and communicate the installation streams to the plurality of helper nodes.

Figure 6:
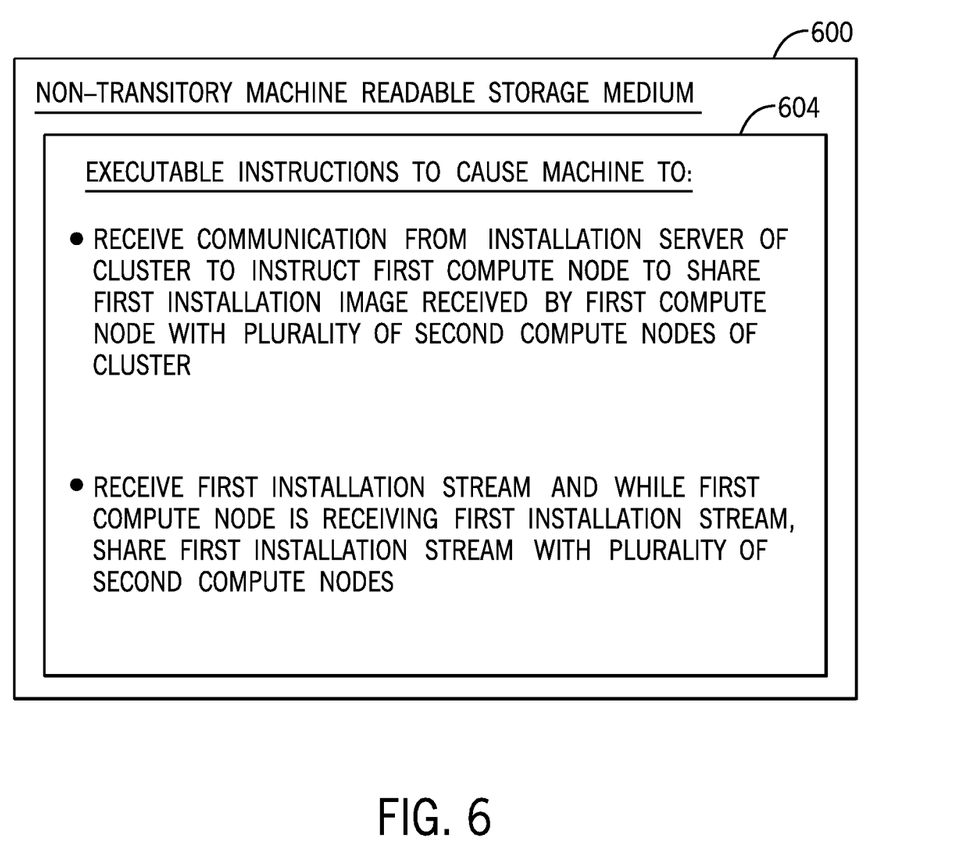
FIG. 6 is an illustration of a non-transitory machine-readable storage medium that stores executable instructions to cause a machine to share an installation image with another compute node according to an example implementation.

Referring to FIG. 6, in accordance with example implementations, a non-transitory machine readable storage medium 600 stores instructions 604 that, when executed by a first compute node (a machine) of a cluster of compute nodes, cause the first compute node to receive instructions in the compute node instructing the first compute node to share a first installation stream with a plurality of second compute nodes. The instructions 604, when executed by the first compute node, further cause the first compute node to receive the first installation stream while receiving the first installation stream, share the first installation stream with the plurality of second compute nodes.

In accordance with example implementations, sharing the first installation stream further includes the first compute node communicating data received from the first installation session representing the image to the second compute node via the second installation stream before the first compute node stores the data in a storage of the first compute node. A particular advantage is that the installation stream sharing may be used to quickly transfer installation images throughout the cluster to minimize compute node boot times.

In accordance with example implementations, the first compute node may access data representing a list of compute nodes in which the first compute node is to share the first installation stream. A particular advantage is that sharing roles may be designated based on network topology to prevent points of network saturation.

In accordance with example implementations, sharing the first installation stream may further include the first compute node sharing the first installation stream with each compute node of the list of compute nodes. A particular advantage is that sharing roles may be designated based on network topology to prevent points of network saturation.

In accordance with example implementations, the first compute node may request an installation session and a node installation environment, and an installation server may begin the installation session to communicate the first installation stream to the first compute node in response to the request. A particular advantage is that the installation server may wait for a predetermined time for installation requests so that the image sharing roles may be designated based on the number of installation streams being provided by the server and the network topology.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    a first compute node of a cluster of nodes receiving a communication instructing the first compute node to provide an installation image received by the first compute node to a second compute node of the cluster, wherein the first compute node and the second node are peers, and the installation image comprises data representing a root file system to boot the first compute node and the second compute node; and
    sharing a first installation stream that communicates the installation image to the first compute node, wherein sharing the first installation stream comprises, while the first compute node is receiving the first installation stream, the first compute node providing a second installation stream to communicate parts of the installation image received via the first installation stream to the second compute node.

2. The method of claim 1, wherein sharing the first installation stream further comprises:
    the first compute node communicating data received from the first installation session representing the image to the second compute node via the second installation stream before the first compute node stores the data in a storage of the first compute node.

3. The method of claim 1, further comprising:
    the first compute node accessing data representing a list of compute nodes for which the first compute node is to share the first installation stream, wherein the list of compute nodes includes the second compute node.

4. The method of claim 3, wherein sharing the first installation stream further comprises the first compute node sharing the first installation stream with each compute node of the list of compute nodes.

5. The method of claim 1, further comprising:
    the first compute node requesting an installation session in a node installation environment; and
    an installation server beginning an installation session to communicate the first installation stream to the first compute node in response to the request.

6. The method of claim 1, wherein sharing the first installation stream comprises the first compute node executing a script to establish byte streams corresponding to the first installation stream and the second installation stream and transfer data between the first installation stream and the second installation stream.

7. The method of claim 1, wherein sharing the first installation stream further comprises the first compute node executing a command to read data from the first installation stream and simultaneously write data to a plurality of other installation streams, wherein the plurality of other installation streams includes the second installation stream.

8. A first compute node comprising:
a processor; and
a memory to store instructions that, when executed by the processor, cause the processor to:
identify a plurality of helper compute nodes to receive a plurality of installation streams, wherein each helper compute node of the plurality of helper compute nodes to receive a corresponding installation stream of the plurality of installation streams to install a root file system on the helper compute node;
instruct a given helper compute node of the plurality of helper compute nodes to share the corresponding installation stream received by the given helper compute node with a corresponding set of peer compute nodes; and
communicate the plurality of installation streams to the plurality of helper nodes.

9. The first compute node of claim 8, wherein the instructions, when executed by the processor, further cause the processor to identify at least one of the plurality of helper nodes and assignments for the corresponding set of peer compute nodes based on a network topology.

10. The first compute node of claim 8, wherein the instructions, when executed by the processor, further cause the processor to perform at least one of an identification of the plurality of helper compute nodes or the corresponding set of peer compute nodes for each helper node of the plurality of helper nodes to minimize network switch-to-network switch communications.

11. The first compute node of claim 8, wherein the instructions, when executed by the processor, further cause the processor to communicate secure shell (SSH) commands to the given helper compute to cause the given helper compute node to perform the sharing.

12. The first compute node of claim 8, wherein the first compute node and the plurality of helper compute nodes are part of a cluster, and wherein the instructions, when executed by the processor, further cause the processor to:
in response to a boot up of the cluster, delay for a predetermined period of time to receive installation requests; and
based on the installation requests and a network topology, designate compute nodes of the cluster as being the plurality of helper compute nodes and the set of peer compute nodes.

13. The first compute node of claim 8, wherein the instructions, when executed by the processor, further cause the processor to:
designate compute nodes of the cluster as being the plurality of helper compute nodes and the set of peer compute nodes based on a predetermined list.

14. A non-transitory machine-readable storage medium to store instructions that, when executed by a first compute node of a cluster of compute nodes, cause the first compute node to:
receive a communication from an installation server of the cluster to instruct the first compute node to share a first installation image received by the first compute node with a plurality of second compute nodes of the cluster, wherein the first installation image comprises data representing a root file system to boot the first compute node and the plurality of second compute nodes; and
receive the first installation stream and while the first compute node is receiving the first installation stream, share the first installation stream with the plurality of second compute nodes.

15. The storage medium of claim 14, wherein the sharing comprises the first compute node providing a plurality of second installation streams, and the instructions, when executed by the first compute node, further cause the first compute node to communicate first data received from the first installation stream to the plurality of second installation streams before storing the data.

16. The storage medium of claim 14, wherein the sharing comprises the first compute node providing a plurality of second installation streams, and the instructions, when executed by the first compute node, further cause the first compute node to execute a command to read data from the first installation stream and simultaneously write the data to the plurality of second installation streams.

17. The storage medium of claim 14, wherein receiving the installation image comprises receiving an archive stream representing a root file system.

18. The storage medium of claim 14, wherein the instructions, when executed by the first compute node, further cause the first compute node to receive commands from the installation server to be executed by the first compute node to share the first installation stream.

19. The storage medium of claim 14, wherein the instructions, when executed by the first compute node, further cause the first compute node to establish secure shell (SSH) connections with the plurality of second compute nodes and use each SSH connection of the SSH connections to communicate a tape archive stream representing a root file directory.

20. The storage medium of claim 14, wherein the instructions, when executed by the first compute node, cause the first compute node to execute a script to share the installation stream.

* * * * *